Dec. 5, 1933.  B. J. UKROPINA  1,938,230
CONCRETE PIPE MAKING MACHINE
Filed July 6, 1931   10 Sheets-Sheet 5

INVENTOR
B. J. UKROPINA.
BY
ATTORNEY.

Dec. 5, 1933.  B. J. UKROPINA  1,938,230
CONCRETE PIPE MAKING MACHINE
Filed July 6, 1931  10 Sheets-Sheet 6

INVENTOR.
B. J. UKROPINA.
BY
ATTORNEY.

Dec. 5, 1933.          B. J. UKROPINA          1,938,230
CONCRETE PIPE MAKING MACHINE
Filed July 6, 1931          10 Sheets-Sheet 9

INVENTOR.
B. J. UKROPINA.
BY
ATTORNEY.

Patented Dec. 5, 1933

1,938,230

UNITED STATES PATENT OFFICE 1,938,230

CONCRETE PIPE MAKING MACHINE

Bozidar J. Ukropina, Los Angeles, Calif.

Application July 6, 1931. Serial No. 548,969

20 Claims. (Cl. 25—30)

This invention relates to improvements in concrete pipe making machines.

The general object of the invention is to provide an improved centrifugal concrete pipe making machine.

A more specific object of the invention is to provide a device for making concrete pipe in a mold wherein the concrete is mechanically packed into a mold form by a former head arranged within the mold and thereafter the concrete is centrifugally packed and the moisture removed by rotating the mold at a high speed.

Another object of the invention is to provide an improved portable concrete pipe making machine.

A further object of the invention is to provide a concrete pipe making machine including a vertical mold having a concrete compacting member movable within the vertical mold.

An additional object of the invention is to provide a concrete pipe making machine including a mold which rotates in one direction and a concrete compacting member for mechanically compacting the concrete and which simultaneously rotates in a reverse direction.

A further object of the invention is to provide a vertically arranged concrete mold with mold means movable within the mold to agitate and pack concrete within the mold.

A further object of the invention is to provide an improved rotatable troweler for use in a concrete pipe machine.

Another object of the invention is to provide an improved agitator for mixing and packing concrete within a cylindrical mold.

A further object of the invention is to provide means on the former member of a concrete pipe making machine for forming a calking recess in the bell end of a concrete pipe.

An additional object of the invention is to provide a concrete pipe making machine including a support for a mold, with a mold on said support, with means to rotate the mold in one direction together with means to inject concrete into the mold, with agitators mounted to rotate in the mold in a direction opposite to that of the mold and with trowel heads mounted to rotate in the same direction as the agitators but at different speeds from the agitators.

A further object of the invention is to provide an improved method of making concrete pipe.

An additional object of my invention is to provide an improved method for making concrete pipe wherein the ingredients are first compacted mechanically without centrifugal force and are thereafter spun to complete the pipe.

An additional object of my invention is to provide a concrete pipe making machine in which means is provided for impelling concrete mechanically against a revolving mold.

Other objects of the invention will be apparent from the following description taken in connection with the accompanying drawings wherein.

My invention as set forth in the accompanying specification and as illustrated in the accompanying drawings includes the continuous agitation, placing and packing of the concrete within the mold without centrifugal action after which the mold is spun at high speed thus extracting the surplus water with a minimum segregation of concrete materials.

By placing the concrete mechanically without the use of centrifugal action prevents segregation of the materials constituting the concrete mixture. In the structure embodying my invention which I will now proceed to describe, the mold is relatively slowly rotated in one direction while the concrete is mechanically impelled against the mold by movement in a direction opposite to that of the mold. This action in effect gives a double packing action which shortens the time of manufacture and which in addition lines the mold with concrete wherein the aggregates remain evenly distributed.

In making concrete pipe by placing the mixture in a mold which is rotating at high speeds the heavier aggregates immediately find their way outwardly while the lighter aggregates either remain or are forced inwardly and consequently a pipe is made which is inferior to my pipe wherein the aggregates are mechanically packed in a relatively slowly rotating mold and are packed so tightly by this mechanical operation that when the mold is afterwards spun to centrifugally extract the surplus moisture there is no substantial displacement of aggregates so that the substantial uniform mixture of aggregates remains unaltered.

Referring now to the drawings by reference characters I have indicated my improved concrete pipe making machine generally at 10. As shown the device 10 comprises a base frame 12 which is shown as mounted on wheels 13. On the base frame 12, I provide a rotary table 14 which includes a supporting member 15 secured to the base frame 12, and a rotary member 16. The supporting member 15 and the rotary member 16 both include a preferably cylindrical central aperture 17 and are provided with runways 18 in which anti-friction bearing members 19 are positioned on which the rotary member 16 is adapted to rotate.

Figure 2:
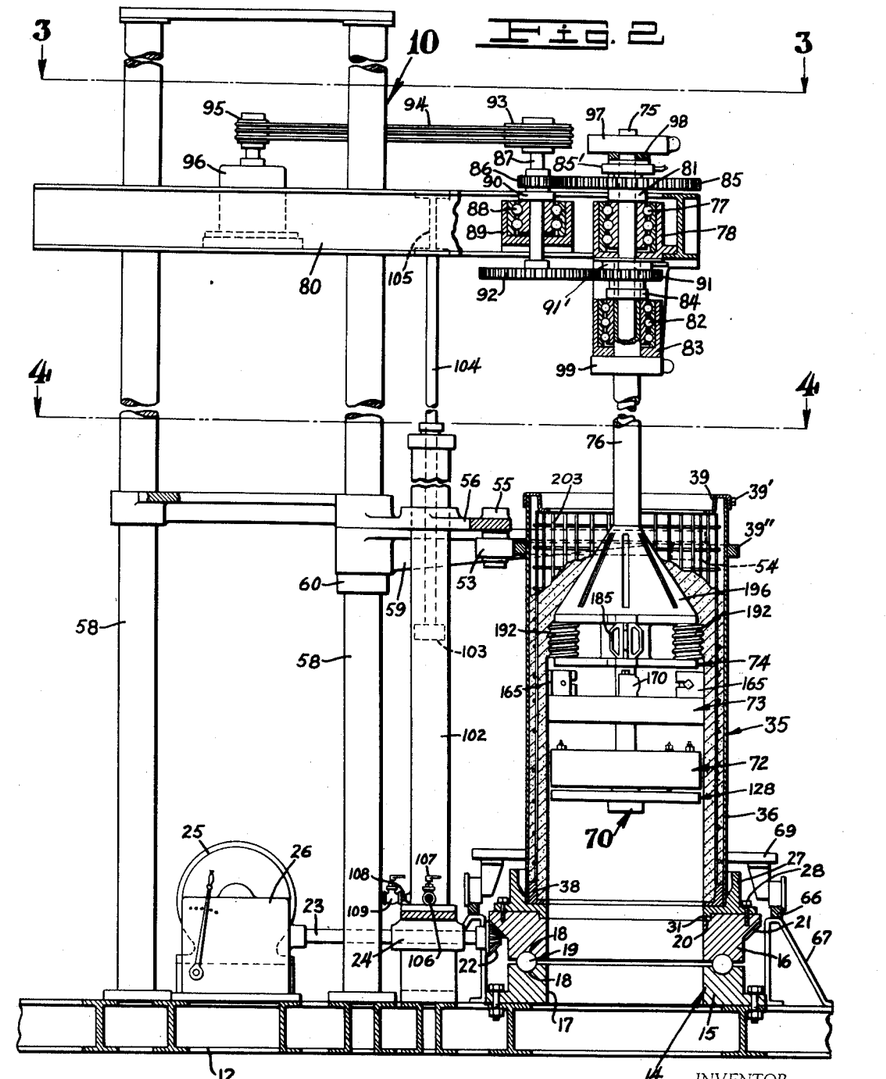
Fig. 2 is a vertical sectional view partly in elevation showing my invention.
Figure 3:
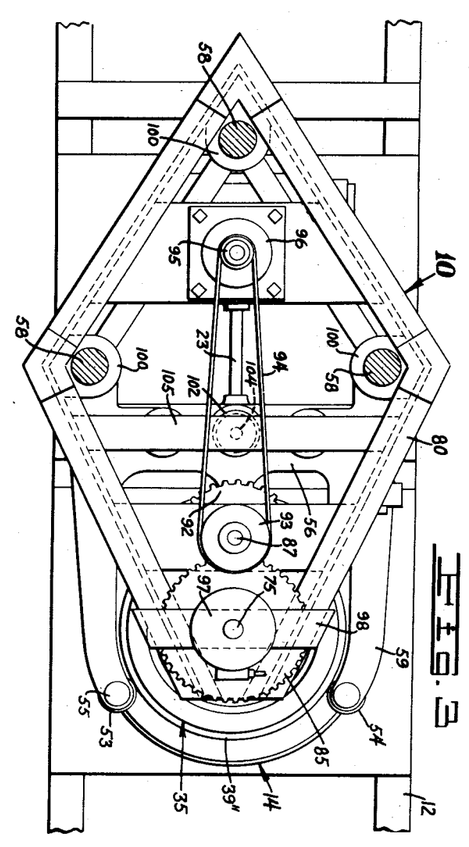
Fig. 3 is a section taken on line 3—3, Fig. 2.
Figures 7, 8, 9:
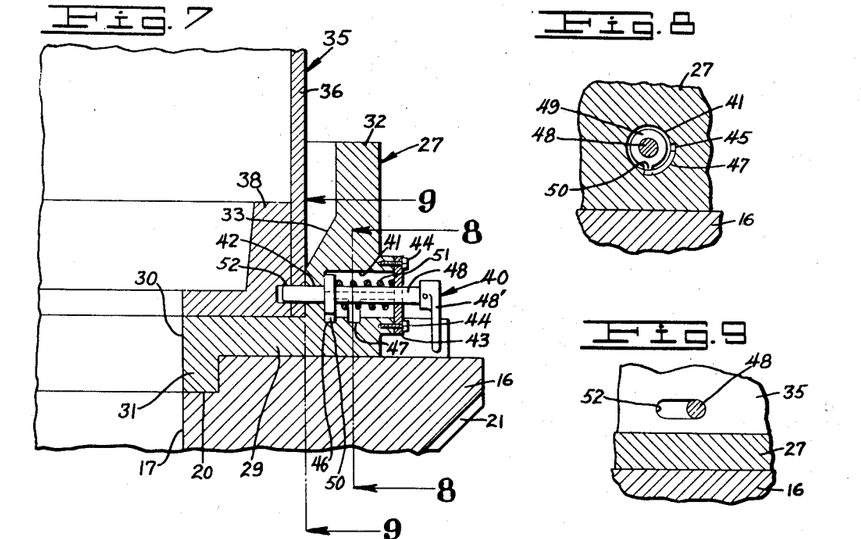
Fig. 7 is a sectional view through the mold locking means.
Fig. 8 is a fragmentary section taken of line 8—8, Fig. 7.
Fig. 9 is a section taken on line 9—9, Fig. 7.

Adjacent the upper end of the aperture 17 in the rotary member 16, I provide a rabbeted recess 20 and on the outer portion of the rotary member I provide an annular bevel gear toothed rack 21 (see Figs. 2 and 7).

For rotating the member 16, I provide a bevel pinion gear 22 which meshes with the gear toothed rack 21 and is secured to a shaft 23. The shaft 23 is journaled in a bearing 24 and is driven at any desired speed by an electric motor 25 through the medium of a change speed transmission 26.

From the foregoing it will be apparent that when the motor 25 is started the rotary member 16 will be rotated at the desired speed through the medium of the transmission 26, the shaft 23 and the gear 22.

Positioned on the rotary member 16, I provide a mold ring 27 which is secured to the rotary member 16 by a plurality of bolts 28. The mold ring 27 includes a base 29 having a central aperture 30 therein and has a downwardly extending flange 31 which is positioned in the recess 20 of the rotary member 16. The mold ring 27 further includes an upwardly extending flange 32, the upper inner portion of which is beveled as at 33 to facilitate the centering of a mold (see Figs. 2 and 7).

A concrete pipe mold 35 is adapted to be positioned on the mold ring 27. As shown the mold 35 includes a split shell 36 which is secured together by a plurality of bolts and nuts 37 and includes an end ring 38. Various types of end rings may be used to form the spigot end of a pipe. The mold further includes a retaining ring 39 which forms the bell end of a pipe and which is removably secured to the shell 36 adjacent the upper end thereof by a plurality of bolts 39'. Adjacent to the upper end of the mold 35 I provide a bearing ring 39'' on the outer periphery of the shell 36.

For retaining the mold 35 in engagement with the mold ring 27 a plurality of latch devices 40 on the mold ring are provided as shown in detail in Figs. 7, 8 and 9. As shown each of the latch devices is fitted in a recess 41 in the mold ring. A reduced aperture communicates with the recess 41 and opens through the inner surface of the flange 32. The open end of the recess 41 is closed by a cap 43 which may be secured to the mold ring by a plurality of bolts 44. In the surface of the recess 41 I provide a longitudinal groove 45 and adjacent the closed end of the recess 41 I provide an arcuate groove 46 which communicates with the groove 45 and adjacent the open end of the recess 41, I provide a similar arcuate groove 47 (see Figs. 7 and 8).

Positioned in the aperture 42 and extending through the recess 41 and through a recess in the cap 43, I provide a plunger 48 having a handle 48' secured thereon at the end adjacent the cap. Secured to the plunger 48 intermediate the length thereof and positioned in the recess 41, I provide an enlarged collar 49 having a radially extending finger 50 thereon which is adapted to slide in the grooves 45, 46 and 47. Surrounding the plunger 48 and positioned in the recess 41 between the collar 49 and the cap 43, I provide a coiled spring 51.

When the mold 35 is positioned in the mold ring 27 the inner ends of the plungers 48 are positioned in elongated recesses 52 which are provided in the mold shell 36 and the end members 38 as shown in Figs. 7 and 9. When the plungers 48 are in this position they prevent the mold from being raised and provide means for causing the mold to rotate with the mold ring. Furthermore when the plungers are in this position they are turned so that the fingers 50 on the collars 49 are positioned in the annular grooves 46. When the fingers 50 are positioned in the grooves 46 centrifugal force due to the rotation will not move the plungers 48 against the action of the spring 51 and out of the mold recesses 52 when the mold ring is rotated at high speeds.

To release the mold 35 from the mold ring 27 the plungers 48 are turned so that the fingers 50 on the collars 49 are positioned in the grooves 45 and then the plungers are moved outward against the action of the coiled springs 51 until the fingers 50 register with the grooves 47 and then the plungers are turned so that the fingers enter the grooves 47 thereby retaining the plungers in a released position.

Figure 4:
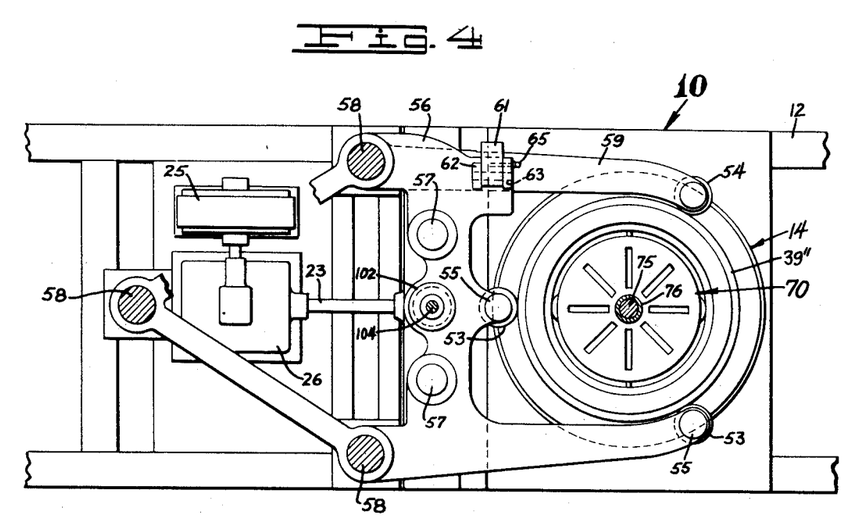
Fig. 4 is a section taken on line 4—4, Fig. 2.

For retaining the upper end of the mold 35 in correct alignment I provide a pair of fixed rollers 53 and a movable roller 54 (see Figs. 2 and 4). The fixed rollers 53 are shown as rotatably supported by bearings 55 which are secured to a frame 56 which is mounted on a pair of posts 57 secured to the frame 12 and anchored to two of a group of three posts 58 which are arranged in triangular formation and secured to the frame 12 (see Figs. 2 and 4). The movable roller 54 is shown as rotatably mounted on an arm 59 which is pivotally mounted on one of the posts 58 and supported by a collar 60 secured to the frame post.

Figure 5:
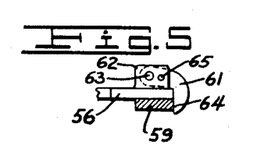
Fig. 5 is a fragmentary view showing the latch member.

The rollers 53 and the roller 54 are adapted to engage the bearing ring 39'' on the mold 35, and to retain the roller 54 in engagement with the bearing ring 39″, I provide a latch member 61 (see Figs. 4 and 5). The latch member 61 is pivoted to bosses 62 on the frame 56 as indicated at 63 and includes a hooked end 64 which is adapted to engage the outer face of the arm 59 to prevent the arm from swinging away from the mold. Any suitable means may be used for retaining the latch member in engagement with the arm 59 but I have shown a pin 65 which passes through an aperture in the latch member 61 and is positioned in apertures in the bosses 62.

When the mold 35 is being positioned on the mold ring 27 or removed therefrom the latch member 61 is released and swung out of engagement with the arm 59 and the arm 59 is swung about the axis of the pivotal post 58 to one side to allow free access of the mold to the device or free egress of the mold from the device.

Figure 1:
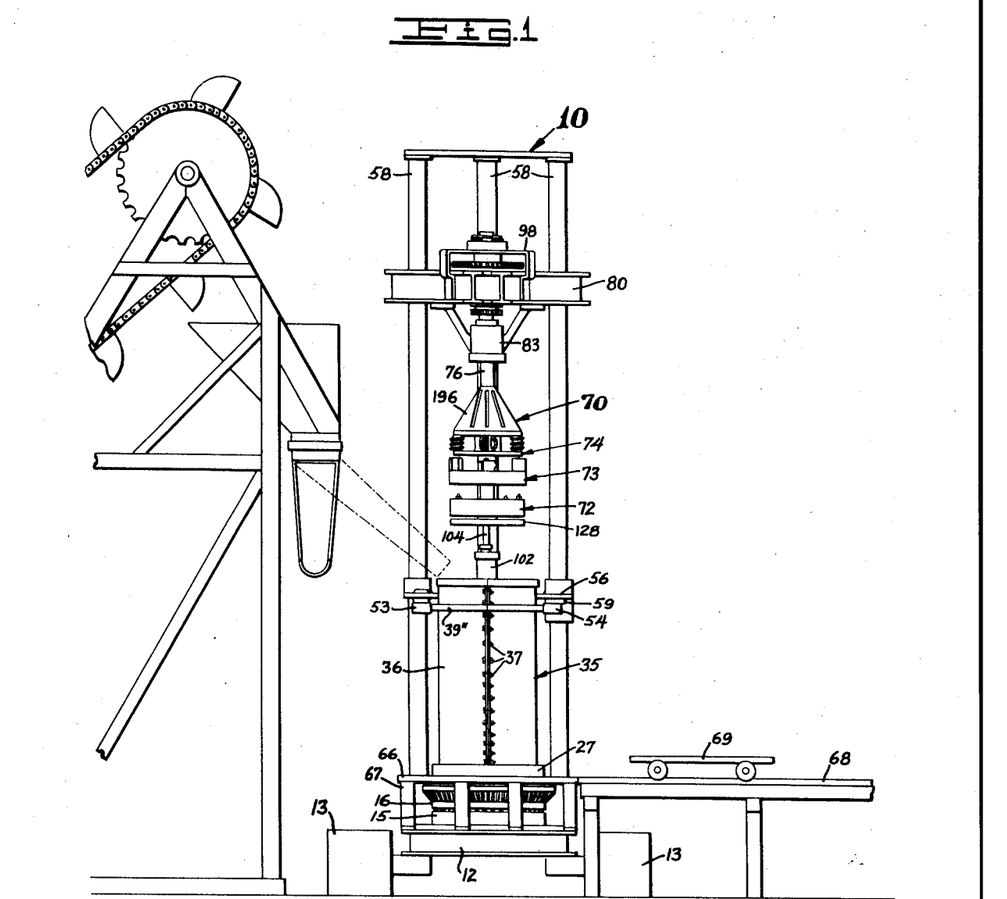
Fig. 1 is a side elevation of a machine embodying the features of my invention.

Extending transversely of the frame 12 on each side of the rotary table I provide rails 66 each of which are supported by standards 67 secured to the frame 12. As shown in Fig. 1 the rails 66 are adapted to be aligned with other similar rails 68 on which a car 69 is positioned. The car 69 is adapted to convey empty molds 35 to the device and convey molds having a finished pipe therein away from the device.

Figure 6:
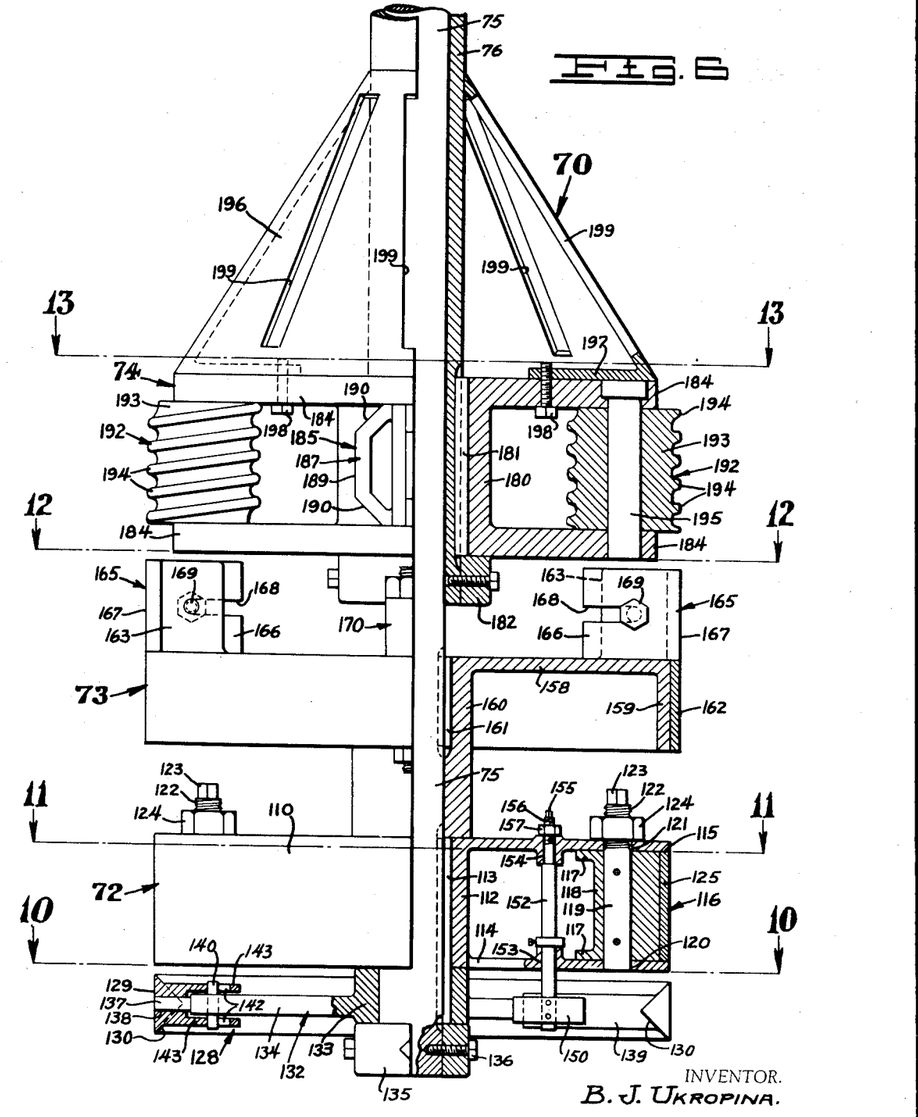
Fig. 6 is an enlarged sectional view partly in elevation showing former head.

For distributing and packing the concrete from which a pipe is made I provide a former head which I have indicated generally at 70 and shown in detail in Fig. 6. As shown the former head 70 comprises a water head 72, a trowel head 73 and a distributor head 74. The water head 72 is secured to a vertical shaft 75 and the trowel head 73 is spaced above the water head and also secured to the shaft 75 while the distributor head 74 is secured to a sleeve 76 which surrounds the shaft 75.

The upper end of the shaft 75 is journaled in an anti-friction bearing 77, which is supported by a cross arm 78 secured to a frame 80. Secured to the shaft 75 above the bearing 77, I provide an enlarged collar 81 which rests on the inner raceway of the anti-friction bearing and supports the shaft 75.

The upper end of the sleeve 76 is journaled in an anti-friction bearing 82 which is supported by a cross arm 83 secured to the frame 80. Secured to the sleeve 76 above the bearing 82, I provide an enlarged collar 84 which rests on the inner raceway of the anti-friction bearing 82 and supports the sleeve 76.

Positioned on the shaft 75 above the collar 81, I provide a gear 85 which meshes with a gear 86 secured to a shaft 87. The shaft 87 is journaled in an anti-friction bearing 88 which is supported by a cross arm 89 secured to the frame 80. Secured to the shaft 87 above the bearing 88, I provide an enlarged collar 90 which rests on the inner raceway of the bearing 88 and supports the shaft 87. The gear 85 is adapted to be operably connected to the shaft 75 by a hydraulic clutch mechanism 85′ which is anchored to the bracket 98 and may be of any desired construction.

Positioned on the sleeve 76 above the collar 84, I provide a gear 91 which meshes with a gear 92 secured to the shaft 87. For rotating the shaft 87, I secure thereto above the gear 86 a rope belt pulley 93 which is adapted to be driven by a rope belt 94 from a similar pulley 95 secured to the armature shaft of a suitable variable speed electric motor 96 which is mounted on the frame 80.

The gear 91 is adapted to be operably connected to the sleeve 76 by a hydraulic clutch mechanism 91′ which is anchored to the cross arm 78 and may be of any desired construction.

Surrounding the shaft 75 to control the speed thereof above the gear 85, I provide a fluid brake mechanism 97 which may be of any desired construction and which is suitably anchored to a bracket 98 secured to the frame 80.

To control the speed of the sleeve 76, I surround the sleeve 76 below the bearing 82 with a fluid brake mechanism 99 which like the brake mechanism 97 may be of any desired construction and which is suitably anchored to the cross arm 83.

From the foregoing it will be apparent that when the motor 96 is operated it will rotate the shaft 87 through the medium of the pulleys 95 and 93 and the belt 94. When the shaft 87 is thus rotated it will rotate the gears 86 and 92 which in turn through the medium of the clutches 85′ and 91′ will rotate the gears 85 and 91. As the gear is rotated it rotates the shaft 75 which in turn rotates the water head 72 and the trowel head 73 and when the gear 91 is rotated it rotates the sleeve 76 which in turn rotates the distributor head 74. Suitable controls may be provided for controlling the speed of the motor 96 and the gear ratios for driving the shaft 75 and sleeve 76 may be altered to suit the requirements.

The frame 80 has a plurality of bearings 100 which are spaced in triangular formation and in which the vertical posts 58 are positioned.

Mounted on the bearing 24, I provide a cylinder 102 in which a piston 103 is positioned having a piston rod 104 secured thereto. The upper end of the piston rod 104 engages a cross arm 105 on the frame 80. Adjacent the lower end of the cylinder I provide a supply of pipe 106 which extends from a suitable source of pressure fluid (not shown) and the pipe 106 is provided with a suitable throttle valve as indicated at 107. The cylinder 102 is further provided with an exhaust pipe 108 having interposed therein a control valve 109. When compressed air is used as the medium for moving the piston 103 the exhaust from the pipe 108 may pass directly to the atmosphere and when oil under pressure is used as the medium for moving the piston 103 the pipe 108 directs the exhaust from the cylinder to a suitable reservoir.

From the foregoing it will be apparent that when a fluid under pressure is admitted to the cylinder 102 the fluid will move the piston 103 and the piston rod 104 upward whereupon the piston rod 104 will move the frame 80 upward. The distance the frame 80 is moved upward is such that the entire former head 70 will be moved upward to clear the top of the mold form 35.

The water head 72 comprises an annular hollow drum 110 having a central hub 112 in which the shaft 75 is positioned and secured thereto by a key 113. The drum 110 is provided with a plurality of apertures 114 in the bottom wall thereof and with a pair of apertures 115 in opposed side walls and adjacent each of the apertures 115 I provide a scraper member 116 (see Figs. 6 and 11).

Figure 11:
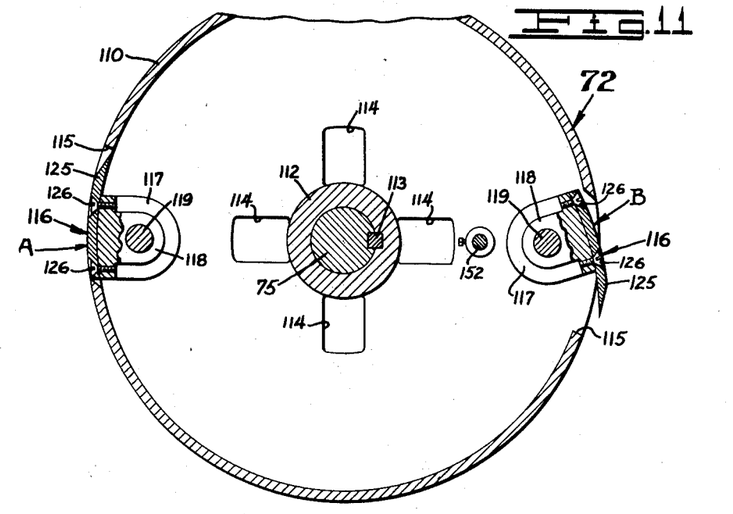
Fig. 11 is a section taken on line 11—11, Fig. 6.

The scraper members 116 are shown as positioned in the drum 110 between the top and bottom walls thereof and each include spaced top and bottom members 117 which are connected by a hub 118 and are secured to a pin 119. The lower end of the pin 119 is pivotally mounted in an aperture 120 in the bottom wall of the drum and the upper portion of the pin extends through an aperture 121 in the upper wall of the drum and is threaded as indicated at 122 and provided with a reduced wrench engaging portion 123. To retain the scraper in an adjusted position I provide a lock nut 124 which engages the threaded portion 122 of the pin 119.

Mounted on the hub 118, I provide a blade 125 which is removably secured to the hub 118 by a plurality of screws 126. In an inoperative position of the scraper 116 the blade 125 is adapted to be positioned within the confines of the outer side wall of the drum as shown at A in Fig. 11, and in an operative position of the scraper the blade 125 is adapted to extend and be secured beyond the outside wall of the drum as shown at B in Fig. 11.

Mounted on the shaft 75 below the drum 72, I provide a finishing member 128 which is shown in detail in Figs. 6 and 10. As shown the finishing member 128 includes a split steel ring 129 which is resilient and triangular in cross section with the angular side thereof facing inward as indicated at 130. The ring 129 is supported by a spider 132 which includes a central hub 133 having a plurality of arms 134 radially extending therefrom. The hub 133 of the spider is secured to the shaft 75 by the key 113 and a collar 135 which is secured to the shaft 75 by bolts 136.

At the outer ends of the arms 134 reduced pin portions 137 are provided which are positioned in apertures 138 in the ring 129. On the ring 129 and spaced on each side of the gap I provide an arm 139. The ring 129 is slackly anchored to the spider 132 by a pin 140 which is carried by one of the spider arms 134 and which is positioned in elongated apertures 142 in arms 143 on the ring 129.

The expanding the ring 129, I provide a cam member 150 which is secured to a shaft or stem 152. The stem extends upward through an aperture 153 in the bottom wall of the drum 110 and through an aperture 154 in the top wall of the drum 110. The upper portion of the stem 152 is provided with a wrench engaging portion 155 and a threaded portion 156 on which a nut 157 is positioned for locking the stem in an adjusted position.

Figure 10:
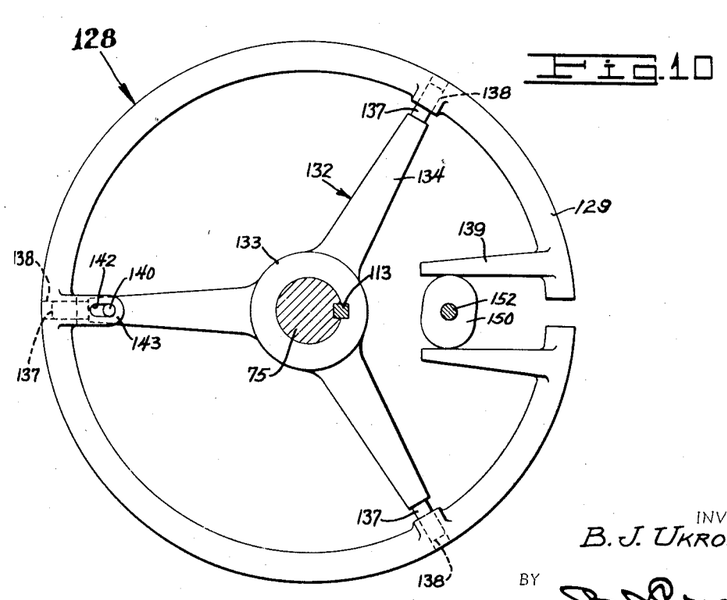
Fig. 10 is a section taken on line 10—10, Fig. 6.

From the foregoing it will be apparent that when the stem 152 is rotated to cause the cam 150 to rotate the ring 129 will be expanded and will move outwardly thereby causing the free ends of the ring 129 to be further spaced apart as shown in Fig. 10. When the stem 152 is rotated in a reverse direction the ring will move inwardly thereby causing the free ends of the ring to move toward each other.

The trowel head 73 comprises an annular plate 158 having a peripheral downwardly extending flange 159 and a central hub 160 in which the shaft 75 is positioned and secured thereto by the key 161. The hub 160 extends below the bottom of the flange 159 and engages the top of the drum 110 thereby spacing the trowel head 73 from the water head 72. Mounted on the outer periphery of the flange 159, I provide a hardened steel band 162 which may be secured to the flange 159 as by shrinking it thereon or by welding.

Adjacent opposed sides of the plate 158 and projecting upwardly therefrom I provide a pair of lugs 163 on each of which I mount a trowel member 165. As shown each of the trowel members 165 include a securing portion 166 having a working portion 167 arranged at approximately right angles thereto. The working portion 167 is adapted to be arranged in a position approximately corresponding to the outer periphery of the trowel head and the portion 166 is provided with a slot 168 in which a bolt is positioned for adjustably securing the trowel member to the lug 163.

Figure 12:
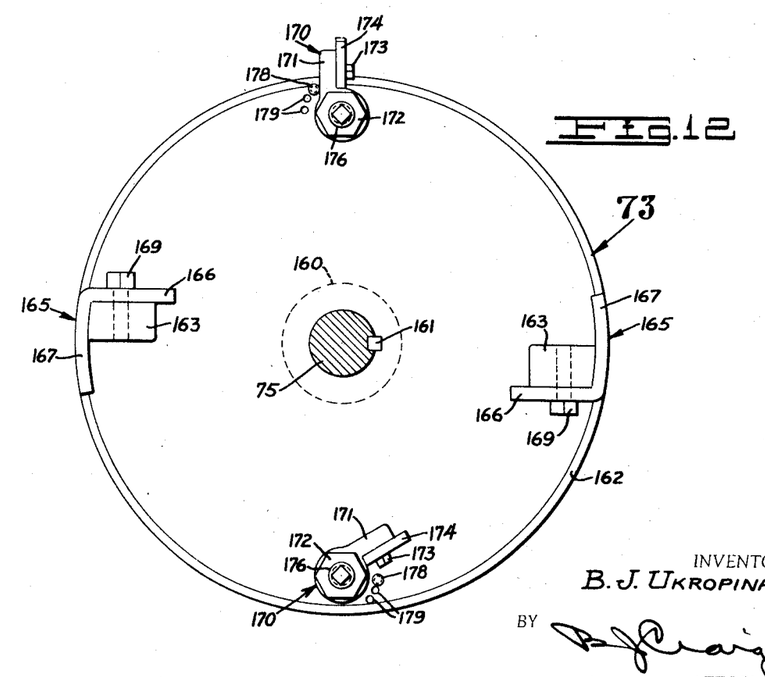
Fig. 12 is a section taken on line 12—12, Fig. 6.
Figure 14:
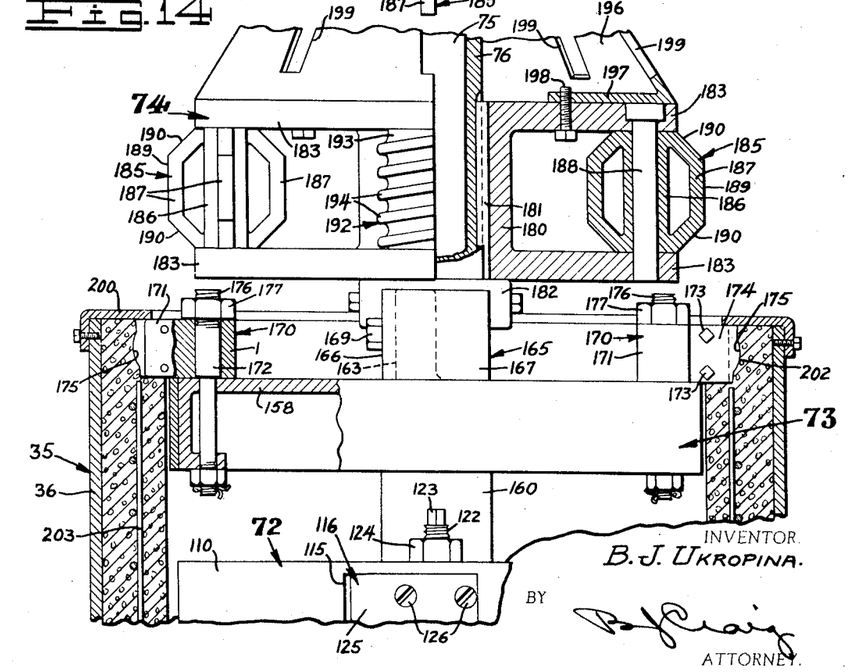
Fig. 14 is a fragmentary central sectional view partly in elevation showing the former head and the end of a formed pipe.

Mounted on the plate 158 of the trowel head 73 adjacent opposed sides thereof I provide calking groove cutters 170 each of which includes a blade holder 171 pivotally mounted on a stud 172 which is suitably secured to the trowel head (see Figs. 12 and 14). Secured to the blade holder 171 as by bolts 173, I provide a cutting blade 174 which is suitably shaped as at 175 to cut the desired recess. The upper portion of the stud 172 is threaded as at 176 and provided with a lock nut 177 which when the blade 174 is in a retracted position is adapted to be tightened down on the blade holder 171 to prevent centrifugal action from swinging the blade outward. When the blade 174 is in an extended position it is adapted to engage a stop pin 178 provided on the plate 158 and the nut 172 may be tightened down on the blade to prevent it from accidently becoming retracted. The stop pin 178 is shown as adapted to be positioned in various apertures 179 in the plate 158 so that the blade 174 may be firmly retained in various adjusted positions.

The distributor head comprises a central hub 180 in which the sleeve 76 is positioned and secured thereto by a key 181 and the hub 180 rests on a collar 182 secured to the sleeve 76. Extending outwardly from each end of the hub 180, I provide two sets of opposed arms 183 and 184.

Figure 13:
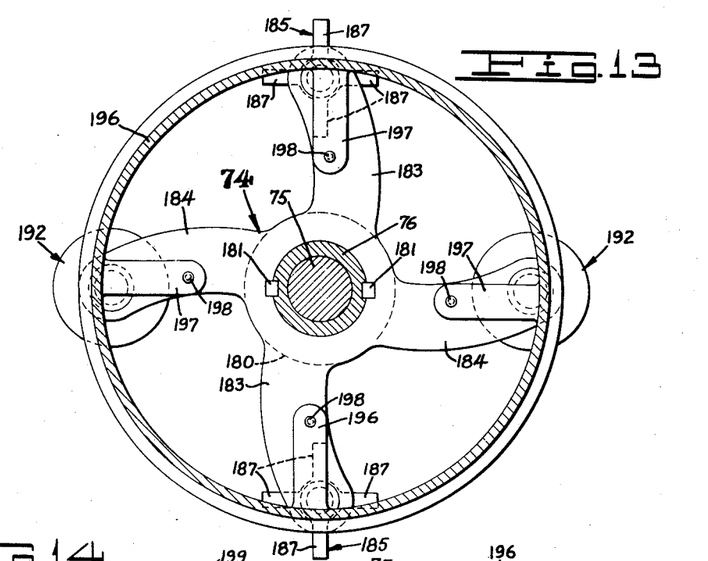
Fig. 13 is a section taken on line 13—13, Fig. 6.

Adjacent the outer ends of the arms 183, I provide distributors 185 each of which includes a hub 186 having a plurality of opposed arms 187 extending therefrom. The hubs 186 are rotatably mounted on spindles 188 carried by the arms 183. The arms 187 each include an intermediate portion 189 which is spaced from the hub 186 and top and bottom portions 190 which are disposed at an angle and connect the intermediate portions 189 to the hub 186 (see Figs. 13 and 14).

Adjacent the outer ends of the arms 184, I provide distributing and packing members 192 each of which includes a hub 193 having spiral fins 194 thereon similar to the teeth of a worm pinion to strike and impel the concrete mixture outwardly and downwardly. The members 192 are each rotatably mounted on pins 195 carried by the arms 184 (see Figs. 6 and 13). The arms 184 are so shaped as to be somewhat stream lined so that turning resistance is lessened.

Surrounding the sleeve 76 above the distributor head 74, I provide a hollow cone shaped member 196 which includes legs 197 which engage the upper arms 183 and 184 of the distributor head 74 and are secured thereto by bolts 198. The base of the cone member 196 is of a diameter approximately of a size to correspond to the length of the arms 183 and 184 and in the inclined wall of the cone member I provide a plurality of elongated apertures or slots 199. The cone prevents bridging of the concrete above the head.

In making concrete with my improved device 10 the frame 80 is moved upward by the piston rod 104 as previously described and the mold form 35 is positioned on and secured to the mold ring 27 by the latch members 40 as previously described. The frame 80 is then lowered so that the former head 70 is positioned in the mold form with the tops of the trowelling members 165 below or approximately flush with what is to be the lower end of the pipe.

After the former head has been lowered the motor 25 is then started to revolve the rotary member 16 and the mold form 35 at a low speed and the clutches 85' and 91' are set so that the gears 85 and 91 will drive the shaft 75 and the sleeve 76 and the motor 96 is started to revolve the former head 70. When the various parts are thus revolving the mold form 35 travels in an opposite direction to that of the former head 70 and at a greater rate of speed than the water drum 72 and the trowel head 73 while the distributing head 74 travels at a faster rate of speed than the mold form 35.

When the device 10 is thus operating the concrete mixture is (from a suitable hopper device much as indicated at C in Fig. 1) poured into the mold form 35. As the concrete mixture falls onto the cone member it moves outwardly towards the walls of the mold form and downwardly into engagement with the members 185 and 192 and into engagement with the mold shell 36. As the concrete moves downwardly along the face of the cone member 196 the edges of the slots 199 in the cone member strike the larger aggregates which tends to settle and mix them with the rest of the concrete. Any concrete which falls through the slots 199 will be thrown outward by impact with the arms 183 and 184 into engagement with the mold shell 36.

As the concrete is thrown into engagement with the mold shell it builds up against the shell and the impingement of the concrete against the members 185 and 192 causes the members 185 and 192 to rotate individually with the mold while their axes rotate with the packer head and the arms 187 thereon pack the concrete against the inside of the mold shell 36 and tightly compact it thereon. As the concrete is packed by the arms 187 and fins 194 of the members 185 and 192 the intermediate arm portions 189 push the concrete horizontally while the upper and lower inclined portions 190 and the fins 194 impel the concrete at an angle which will force the concrete behind any reinforcing members which may be in the pipe and will thereby fill any spaces not filled by the horizontal packing action. The trowels 165 smooth the concrete as they rotate and advance.

The former head 70 continues to move upward and the various elements thereof to function as described until the mold shell 36 is entirely lined with concrete. The motor 96 is then stopped and the scraper members 116 on the water head 72 are adjusted to a position wherein the ends of the blades 125 are extended to a position corresponding to the desired interior diameter of the pipe. Meanwhile the motor 25 is speeded up to rotate the mold at a high rate of speed to centrifugally pack the pipe.

After the pipe has been centrifugally packed the brakes 97 and 99 are set to prevent rotation of the former head 70 and then the former head is again lowered.

After the pipe is partially packed mechanically it will be smaller than the desired size. After packing centrifugally it will be larger than the forming head and water and slurry will accumulate on inner pipe surface.

As the water head 72 travels downward the scraper blades 125 engage the inner surface of the concrete in the mold and scrape the slurry or water and slime from the inner surface of the concrete. As the blades 125 scrape the slurry off it is directed by the blades through the apertures 115 into the drum 110 and then it flows out through the apertures 114 in the bottom wall of the drum. After the water head 72 has been lowered to the bottom of the mold it is again raised out of the mold.

The former head is again raised before or after the blades 125 are retracted and after the former head is raised and the finishing ring 129 is expanded to the size of the interior diameter of the pipe. As the mold continues to rotate the former head is again lowered to the bottom of the mold and as it travels downward the ring 129 removes slight protuberances or corrugations which may be on the interior of the pipe. The former head 70 is then again raised out of the mold and the ring 129 is moved to a retracted position.

After completion of the last operation, the motor 25 is stopped while the retaining ring 39 on the upper end of the mold shell is removed and replaced by a straight retaining ring 200 as shown in Fig. 14. The former head 10 is then lowered until the forming members 170 are in the correct position whereupon the blades 174 are turned to cutting position. The motor 25 is then started slowly to rotate the mold 35 and as the mold rotates the blades 174 of the forming members cut a calking recess adjacent the upper end of the pipe as indicated at 202 in Fig. 14.

After the calking recess 202 has been formed the forming members 170 are moved to a retracted position and then the former head is moved to a position above the mold, the latch members 40 moved to a release position and the mold form 35 removed from the mold ring 27. The pipe and mold may then be taken from the device and cured as desired.

In making reinforced concrete pipe a suitable metal reinforcing cage such as indicated at 203 is positioned in the mold 35 before the concrete is poured therein, and thereafter the pipe is formed as previously described.

In some instances it is desirable to rotate the trowel head, the water head and the finishing ring while they actuate as previously described. When this is desirable the clutch 85' is released, the brake 97 set to prevent rotation of the shaft 75, the brake 91' released and the motor 96 started and then the former head 70 is lowered in and withdrawn from the mold to perform the various steps as previously described.

Figure 15:
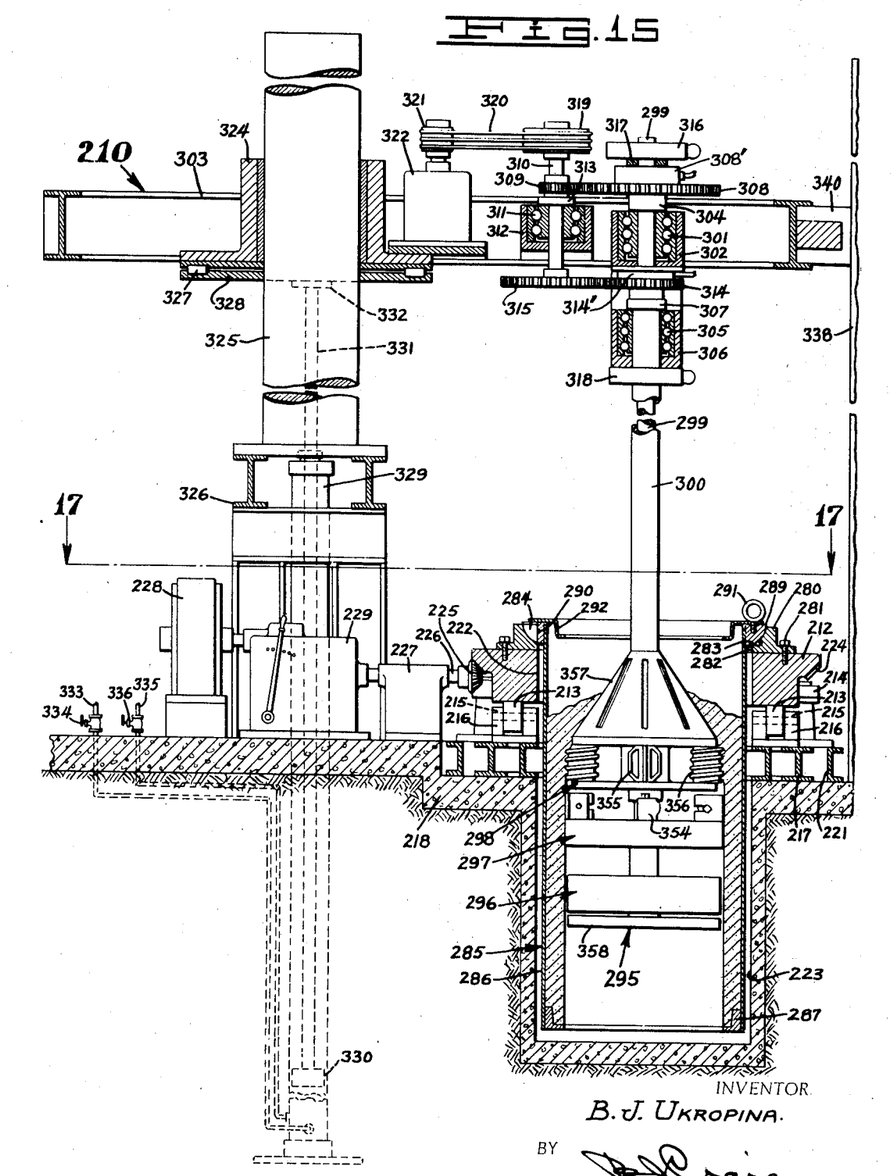
Fig. 15 is a view similar to Fig. 2 showing a modification of my invention.
Figure 16:
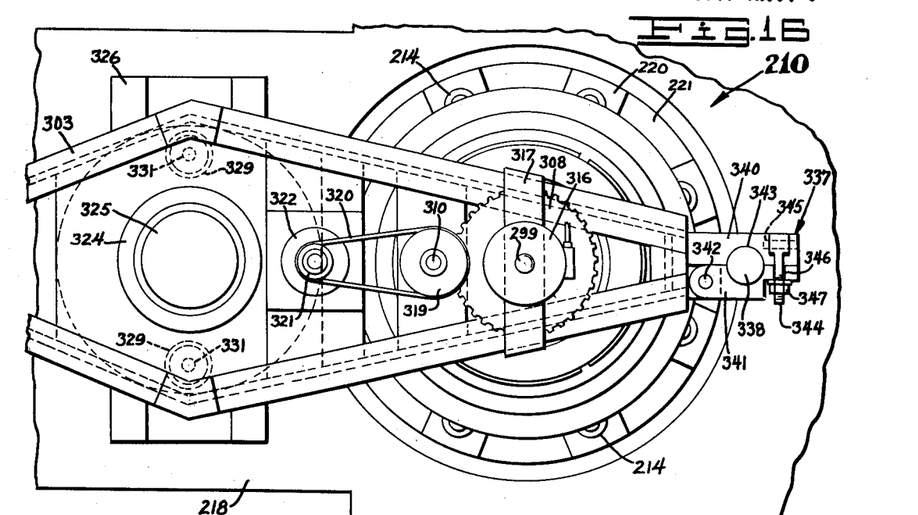
Fig. 16 is a top plan view of a modification.
Figure 17:
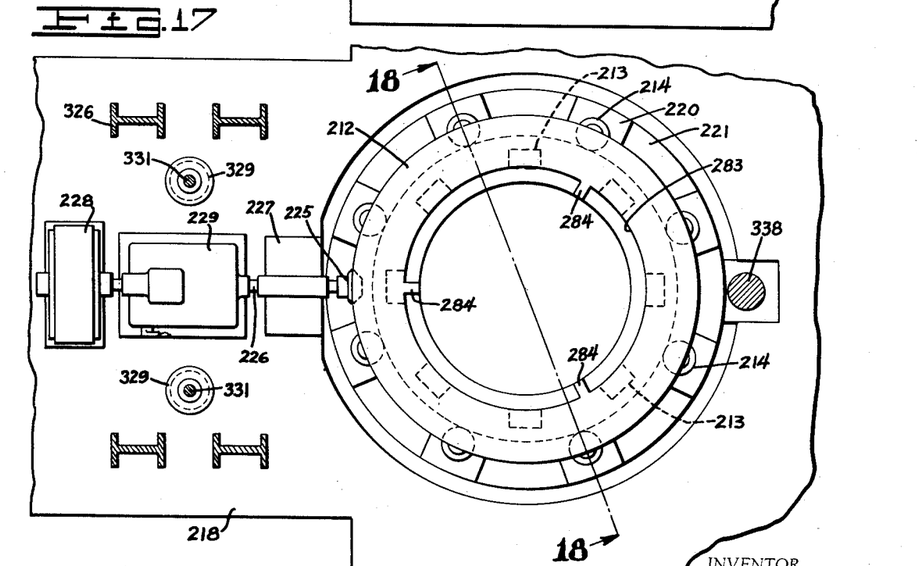
Fig. 17 is a section taken on line 17—17, Fig. 15.
Figure 18:
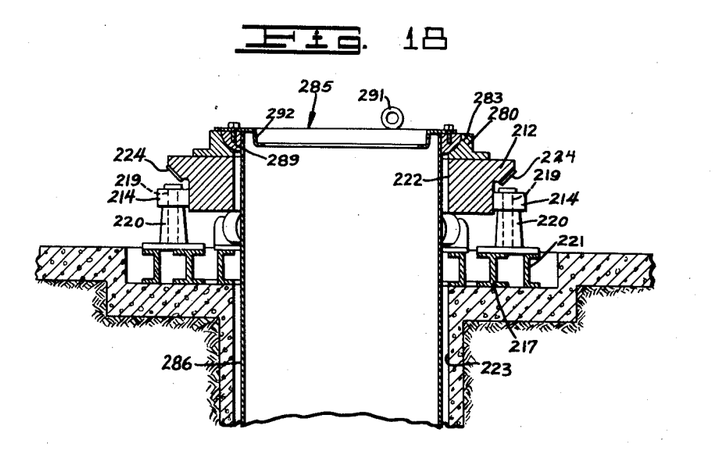
Fig. 18 is a fragmentary section taken on line 18—18, Fig. 17.

In Figs. 15, 16 and 17, I have indicated a modified form of my invention generally at 210. As shown the device 210 includes an annularly shaped rotary table 212 which is supported on a plurality of rollers 213 which engage the under surface of the table and the table is retained in a correct position by a plurality of rollers 214 which engage a portion of the annular periphery of the table. The rollers 213 are secured to shafts 215 which are journaled in bearings 216 mounted on an annular frame 217 which is suitably anchored to a concrete base 218.

The rollers 214 are secured to shafts 219 which are journaled in bearings 220 mounted on annular frame 221 which is suitably anchored to the concrete base 218 and on the frame 217. The rotary table 212 is provided with a coaxial annular aperture 222 and the base 218 is provided with a well 223 which is coaxial with the aperture 222 in the rotary table. The well is provided with a suitable drain.

On the periphery of the table 212 above the portion engaged by the rollers 214, I provide an annular beveled gear toothed rack 224 which is engaged by a beveled pinion 225. The pinion gear 225 is secured to a shaft 226 which is journaled in a bearing 227 anchored to the base 218. The shaft 216 is driven from an electric motor 228 through the medium of a change speed transmission 229.

From the foregoing it will be apparent that when the motor 228 is started the rotary table 212 wil be rotated through the medium of the transmission 229, the shaft 226 and the gear 225.

Positioned on the rotary table 212, I provide a mold ring 280 which is secured to the rotary table by a plurality of bolts 281. The mold ring 280 includes a central aperture 282 which is counter-bored at the upper portion to provide a recess 283 quadrantal in cross section. Extending into the recess at spaced intervals I provide a plurality of key members 284 which are shown as integral with the mold ring.

A concrete pipe mold 285 is adapted to be supported by the mold ring 280. As shown the mold 285 includes a shell 286 which at the lower end is provided with an end ring 287. Various types of end rings may be used but the one shown is adapted to form a spigot end on a pipe.

Adjacent the upper end of the shell 286, I provide a supporting ring 289 which is quadrantal in cross section and is adapted to fit in the similarly shaped recess 283 of the mold ring 280. The supporting ring 289 is provided with a plurality of spaced recesses 290 in which the key members 284 of the mold ring 280 are adapted to be positioned. Extending above the surface of the supporting ring 289, I provide a plurality of eye members 291 by means of which the mold 285 is adapted to be raised.

The mold 285 further includes an apertured retaining plate 292 which is adapted to form the bell end of a pipe and is removably secured to the supporting ring 289 in any desired manner.

From the foregoing it will be apparent that when the rotary table 212 revolves it will revolve the mold ring 280 which will in turn through the medium of the keys 284 revolve the mold 285.

For distributing and packing the cement from which a pipe is made I provide a former head which I have indicated generally at 295. As shown the former head 295 comprises a water head 296, a trowelling head 297 and a distributor head 298. The water head 296 is secured to a vertical shaft 299 and the trowelling head 297 is spaced above the water and also secured to the shaft 299 while the distributor head 298 is secured to a sleeve 300 which surrounds the shaft 299.

The upper end of the shaft 299 is journaled in an anti-friction bearing 301 which is supported by a cross arm 302 secured to a frame 303. Secured to the shaft 299 above the bearing 301, I provide an enlarged collar 304 which rests on the inner raceway of the anti-friction bearing and supports the shaft 299.

The upper end of the sleeve 300 is journaled in an anti-friction bearing 305 which is supported by a cross arm 306 secured to the frame 303. Secured to the sleeve 300 above the bearing 305, I provide an enlarged collar 307 which rests on the inner raceway of the anti-friction bearing 305 and supports the sleeve 300.

Spaced above the collar 304 on the shaft 299, I provide a gear 308 which meshes with a gear 309 secured to a shaft 310. The shaft 310 is journaled in an anti-friction bearing 311 which is supported by a cross arm 312 secured to the frame 303. Secured to the shaft 310 above the bearing 311, I provide an enlarged collar 313 which rests on the inner raceway of the bearing 311 and supports the shaft 310.

Mounted on the sleeve 300 above the collar 307, I provide a gear 314 which meshes with a gear 315 secured to the shaft 310.

Surrounding the shaft 299 above the gear 308, I provide a fluid brake mechanism 316 which may be of any desired construction and is shown as anchored to a bracket 317 secured to the frame 303.

Surrounding the sleeve 300 below the bearing 305, I provide a fluid brake mechanism 318 which is suitable anchored to the cross arm 306. The gear 308 is adapted to be operably connected to the shaft 299 by a hydraulic clutch mechanism 308' which is anchored to the bracket 317 and may be of any desired construction and the gear 314 is adapted to be operably connected to the sleeve 300 by a similar clutch mechanism 314' which is anchored to the cross arm 306.

For rotating the shaft 310, I secure thereto above the gear 309 a rope belt pulley 319 which is adapted to be driven by a rope belt 320 from a similar pulley 321 secured to the armature shaft of a suitable multiple speed electric motor 322 which is mounted on the frame 303.

From the foregoing it will be apparent that when the motor 322 is operating it will rotate the shaft 310 through the medium of the pulleys 321 and 319 and the belt 320. When the shaft 310 is thus rotated it will rotate the gears 309 and 315 which in turn will rotate the gears 308 and 314. As the gear 308 is rotated it rotates the shaft 299 through the medium of the clutch 308' which in turn rotates the water head 296 and the trowel head 297 and when the gear 314 is rotated it rotates the sleeve 300 through the medium of the clutch 314' which in turn rotates the distributor head 298.

The frame 303 has secured thereto a bearing 324 in which a vertical post 325 is positioned which is mounted on a frame 226 suitably anchored to the base 218.

The bearing 324 is mounted on an anti-friction bearing 327 which surrounds the post 325 and which includes a plate 328 surrounding the post 325. Adjacent to the post 325, I provide a plurality of cylinders 329 which extend through the frame 326 and extend below the bore 218. Each of the cylinders 329 has a piston 330 positioned therein having a piston rod 331 secured thereto which extends through the upper end of the cylinder and is provided with an enlarged head 332 which is secured to the plate 328.

Adjacent to the lower end of each of the cylinders 329 I provide a supply pipe 333 which extends from a suitable source of pressure fluid (not shown) and the pipe 333 is provided with a suitable throttle valve as indicated at 334. Each of the cylinders 329 is further provided with an exhaust pipe 335 having a control valve 336 interposed therein.

When compressed air is used as the medium for raising the pistons 330 the exhaust from the cylinders may pass directly to the atmosphere and when oil under pressure is used as the medium for raising the piston the exhaust from the cylinders is directed to a suitable reservoir.

From the foregoing it will be apparent that when fluid under pressure is admitted to the cylinders 329 the fluid will raise the pistons 330 and the pistons rods 333 upward whereupon the piston rods will move the frame 303 upward.

The frame 303 is free to swing about the axis of the post 325 and to retain the frame 303 in an operative position I provide a latch mechanism 337 which is adapted to engage a vertical post 338 which is suitably anchored to the base 218. Any suitable type of latch mechanism may be used but as shown I provide a body portion 340 which is rigidly secured to the frame 303 and a movable member 341 which is pivotally connected to the body portion 340 as indicated at 342. The latch mechanism 337 is provided with an aperture 343 in which the post 338 is adapted to be positioned. Half of the aperture 343 is disposed in the body portion 340 and half in the movable member 341. For retaining the movable member 341 of the latch mechanism in engagement with the body portion 340, I provide a bolt 344 which is pivotally connected to the body portion as indicated at 345. When the movable member 341 is in a closed position the shank of the bolt 344 is positioned in a recess 346 provided in the movable member and a nut 347 on the bolt 344 is adapted to be tightened against the movable member to retain the movable member in a closed position.

When the latch mechanism 337 is closed around the post 338 the frame 303 is free to move vertically but is restricted from swinging about the axis of the post 325.

Figure 19:
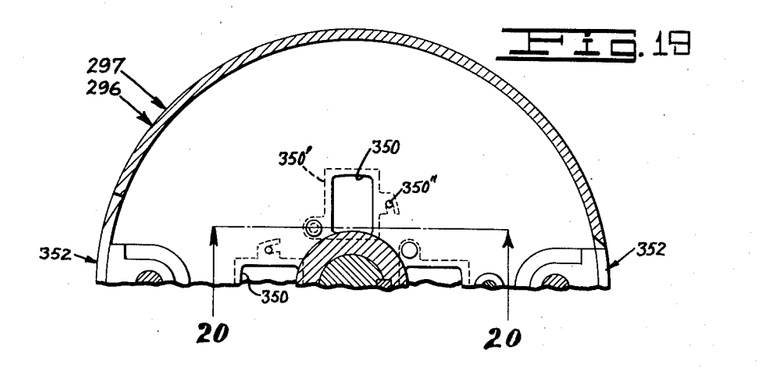
Fig. 19 is a fragmentary sectional view partly in elevation showing the modified water head and closure thereon.
Figure 20:
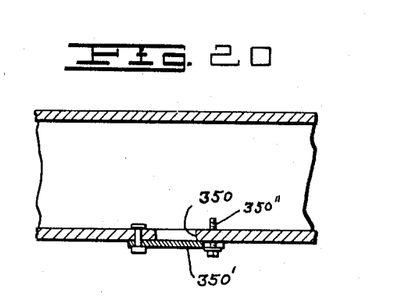
Fig. 20 is a section taken on line 20—20, Fig. 19.

The water head 296 is constructed in the same manner as the water head 72 of the device 10 except that apertures 350 in the bottom wall thereof are provided with pivoted closure members 350′ which include suitable means such as a bolt 350″ for retaining them in a closed position. The water head 296 further includes scraper members 352 which are constructed and actuate in the same manner as the scraper members 116 of the water head 72 in the device 10.

The trowelling head 297 is constructed the same as the trowelling head 73 of the device 10 and includes trowelling members 353 which are constructed and operate in the same manner as the trowelling members 165 of the device 10. The trowelling head 297 like the trowelling head 73 of the device 10 is provided with calking groove cutters 354 which are constructed and actuate in the same manner as the calking groove cutters 170 of the device 10.

The distributor head 298 is constructed and operates in the same manner as the distributor head 74 of the device 10, and includes pivoted distributor members 355 and packer members 356 which are constructed and operate in the same manner as the distributor members 185 and the packing members 192 of the device 10.

Surrounding the sleeve 300 above the distributor head 298, I provide a cone member 357 which is secured to the distributor head 298 similar to the cone member 196 is secured to the distributor head 74 of the device 10. The cone member 357 is constructed similar to and actuates in the same manner as the cone member 196 of the device 10.

Positioned below the water head 296, I provide a finishing ring 358 which is constructed similar to and actuates in the same manner as the finishing ring 129 of the device 10.

In making concrete pipe with the modified form of pipe making machine 210 the frame 303 is moved to a raised position, the latch mechanism 337 is released and the frame 303 swung about the axis of the post 325 to a position wherein the former 295 is to one side of the rotary table 212. The mold 285 is then lowered through the aperture in the rotary table until the mold supporting ring 289 is correctly positioned in the recess 283 of the mold ring 280 with the keys 284 positioned in the key recesses 290 as previously described.

The frame 303 is then swung about the axis of the post 325 until the body portion 340 of the latch 337 engages the post 338 whereupon the movable latch member 341 is secured in a closed position as previously described, thereby preventing accidental lateral movement of the frame 303. The frame 303 is then lowered so that the former head 295 is positioned in the mold adjacent the lower end thereof.

The various steps in making the concrete pipe with the device 210 is the same as previously described in connection with the device 10 and it is thought that a repetition of the steps is unnecessary.

After the concrete pipe has been formed in the mold 285 the frame 303 is moved to a raised position, the latch mechanism 337 is released and the frame 303 is swung about the axis of the post 325 to a position wherein the former head 295 is positioned to one side of the rotary table 212 and then the mold together with the finished pipe is removed from the device 210 and cured as desired.

After the former head 295 has been moved to one side the closure members 350 for the drum apertures are released and swung to an open position whereupon the slurry collected in the drum is removed, after which the closure members are again secured in a closed position.

With my invention the trowel head may remain stationary or it may revolve in a direction opposite to that of the pipe mold. This, together with the vertical movement of the trowel head, serves to pack or tamp the mixture firmly into the mold. The packer and agitator revolves at a high speed causing the material to be impelled outwardly and thus tamping it firmly in place so that there is practically no displacement of aggregates during the final spinning operation of the machine. The shape of the packer and agitator is such that it causes an outward and downward impelling and packing action on the material to thus produce the desired tamping effect.

The fact that I am able to use any mixture and further, due to the fact that the mixture is thoroughly tamped and compacted, prevents separation of the material due to the centrifugal action and prevents movement of the aggregates so that there is no separation of material but simply a slight further packing which displaces the water during the completion of the centrifugal spinning operation.

With my invention, any type of reinforcement may be used in the mold without likelihood of displacement by tampers or by other means during the formation of the pipe.

With my improved pipe machine, various bell ends may be formed after the revolving core has been brought to rest at its top position.

My machine also enables pipes of various sizes and lengths to be made so that it is a simple matter to change from manufacture of one size of pipe to another by using different forming heads. Any corrugations are eliminated from the interior of the pipe and further, the up and down movement of the blades also tends to prevent any formation of corrugations so that the interior of the pipe is a true cylinder.

From the foregoing description it will be apparent that I have invented a novel concrete pipe making machine and method which is simple in construction and highly efficient in operation.

Having thus described my invention, I claim:

1. In a concrete pipe machine, a mold, means to rotate said mold, means to discharge concrete into said mold to form a pipe, a distributor head having means thereon adapted to force the concrete against the inner surface of the mold, a water head having means thereon to remove slurry from the inner surface of said pipe and means to rotate said distributor head and said water head independent of each other.

2. In a pipe making machine a support, a mold rotatably mounted on said support, means to discharge concrete into said mold, rotatable mechanical means to force the concrete against the mold and rotary means rotatable independent of said mechanical means to remove surplus materials and to smooth the concrete after it has been forced against the mold.

3. In a concrete pipe machine, a vertical mold, means to rotate said mold, a former head, means to move said former head longitudinally in said mold, said former head including a water head, a trowel head and a distributor head, means to rotate all of said heads at speeds whereby said distributor head rotates at a greater speed than said water head and said trowel head, means on said distributor head to mechanically impel a concrete mixture poured in the mold against the inner surface of said mold to form a concrete pipe, a plurality of trowel members carried by said trowel head and adapted to engage the inner surface of said pipe, said trowel head including side walls, said water head comprising an annular member, means carried by said member to remove slurry from the inner surface of said pipe and direct said slurry into the interior of said water head and means to drain said slurry out of said water head.

4. In a concrete pipe making machine including a mold, a former head movable longitudinally in said mold, said former head including a distributor member, said distributor member including packing members rotatably mounted, each of said packing members including a hub portion having a finger extending therefrom.

5. In a concrete pipe making machine including a vertical mold, a former head movable longitudinally in said mold, means to rotate said former head, said former head including a distributor member and packer members rotatably mounted on said distributor member, each of said packer members including a grooved portion.

6. In a concrete pipe making machine including a vertical mold, a former head movable longitudinally in said mold, means to rotate said former head, said former head including a distributor member, adapted to mechanically impel concrete poured in the mold against the inner side walls of said mold and including packer members rotatably mounted, each of said packer members including a hub portion having fins extending therefrom and spirally arranged around said hub.

7. In a concrete pipe making machine including a vertical mold, a former head movable longitudinally in said mold, said former head including a distributor member having packer members rotatably mounted thereon, each of said packer members including a hub portion having fins extending therefrom and spirally arranged around said hub, said fins being inclined to direct concrete outwardly and downwardly therefrom.

8. In a concrete pipe making machine including a vertical mold, a former head movable longitudinally in said mold, said former head including a distributor member, means to rotate said distributor member, said distributor member having packing members rotatably mounted thereon, each of said packing members including a hub portion having a plurality of fingers extending therefrom, each of said fingers including a portion spaced from said hub portion and top and bottom members disposed at an angle to and connecting said first portion to said hub portion.

9. In a concrete pipe making machine including a vertical mold, a former head movable longitudinally in said mold, said former head including a water head, means to rotate said water head, a scraper member secured to said water head, said scraper member being adapted to remove slurry from the inner surface of a concrete pipe in said mold.

10. In a concrete pipe making machine including a vertical mold, a water head movable longitudinally in said mold, said water head including a hollow drum, a scraper member, means to adjustably secure said scraper member in position, said scraper member including a slurry collecting member, said member in one position being confined within the outer periphery of said drum and in another position said member extending beyond the outer periphery of said drum and being adapted to remove slurry from the inner surface of a concrete pipe in said mold.

11. In a concrete pipe making machine including a vertical mold, a former head movable longitudinally in said mold, said former head including a water head, means to rotate said water head, said water head including a hollow drum having a plurality of apertures in the side walls thereof, a slurry collecting member pivotally mounted adjacent each of said apertures, means to rotate said members, means to secure said members in adjusted positions, each of said members including a portion which in one position is confined within the outer periphery of said drum and in another position extends beyond the outer periphery of said drum and is adapted to remove slurry from the inner surface of a concrete pipe in said mold and to direct said slurry through said apertures into said drum, and means to drain slurry out of said drum.

12. In a machine for making concrete pipe, a base, means to rotatably support a mold on said base, means to rotate said mold in one direction, a frame, means to raise and lower said frame, a water head and a trowel head rotatably mounted on said frame, means to rotate said water head and said trowel head relative to said mold, a distributor head, and other means to rotate said distributor head.

13. In a machine for making concrete pipe, a base, means to rotatably support a mold on said base, means to rotate said mold in one direction, a frame, means to raise and lower said frame, a water head and a trowel head rotatably mounted on said frame, means to rotate said water head and trowel head in reverse direction and at less speed than the speed of said mold, a distributor head, and means to rotate said distributor head at a greater speed than the speed of water head.

14. In a concrete pipe machine, a base, a supporting member on said base, a rotary member mounted to revolve on said supporting member, a mold supported on said rotary member, independent tamping, packing, trowelling and sizing means progressively movable in said mold for first tamping, then packing then trowelling and thereafter sizing concrete in said mold and means to operate all of said means and means to spin said mold.

15. In a concrete pipe machine, a vertical mold, means to rotate said mold, a former head, means to move said former head longitudinally in said mold, said former head including a water head, a trowel head and a distributor head, means to rotate all of said heads at speeds whereby said distributor head rotates at a greater speed than said water head and said trowel head, means on said distributor head to mechanically impel a concrete mixture poured in the mold against the inner surface of said mold to form a concrete pipe, a plurality of trowel members carried by said trowel head and adapted to engage the inner surface of said pipe, said trowel head including side walls, said water head comprising an annular member and means carried by said member to remove slurry from the inner surface of said pipe.

16. In a concrete pipe making machine including a mold, a head movable longitudinally in said mold, a slurry collecting member, means to adjustably secure said slurry collecting member in position, said member in one position being confined within the outer periphery of the head and in another position said member extending beyond the outer periphery of said head and being adapted to remove slurry from the inner surface of a concrete pipe in said mold.

17. In a concrete pipe making machine including a vertical mold, a former head movable longitudinally in said mold, said former head including a water head, means to rotate said water head, said water head including a hollow drum having a plurality of apertures in the side walls thereof, and slurry collecting members mounted adjacent said apertures, each of said members including a portion which is adapted to extend beyond the outer periphery of said drum and is adapted to remove slurry from the inner surface of a concrete pipe in said mold and to direct said slurry through said apertures into said drum.

18. In a machine for making concrete pipe, a base, means to rotatably support a mold on said base, means to rotate said mold in one direction, a water head and a trowel head, means to mount said water head and said trowel head for simultaneous rotary movement independent of the movement of said mold, means to rotate said water head and said trowel head in a direction reverse to that of the mold, a distributor head, means to mount said distributor head for rotation independently of said water and trowel head and independently of said mold and means to rotate said distributor head in a direction reverse to that of the mold.

19. In a machine for making concrete pipe, a base, means to rotatably support a mold on said base, means to rotate said mold in one direction, a water head and a trowel head, means to mount said water head and said trowel head for rotary movement independent of the movement of said mold, means to rotate said water head and said trowel head at a speed less than the speed of the mold and in a direction reverse to that of the mold, a distributor head, means to mount said distributor head for rotation independently of said water and trowel head and independently of said mold and means to rotate said distributor head.

20. In a concrete pipe making machine, a mold, means to support said mold for rotation about a vertical axis, rotatable means mounted to move into and out of the mold to mechanically pack concrete in said mold to form a pipe, means to remove the water from the inside of the formed pipe, a support at the bottom of the mold, means on said support to drive the mold, an upper support above the mold means carried by said upper support to support said mechanical packing means and means to drive said mechanical packing means.

BOZIDAR J. UKROPINA.